Patented Sept. 25, 1945

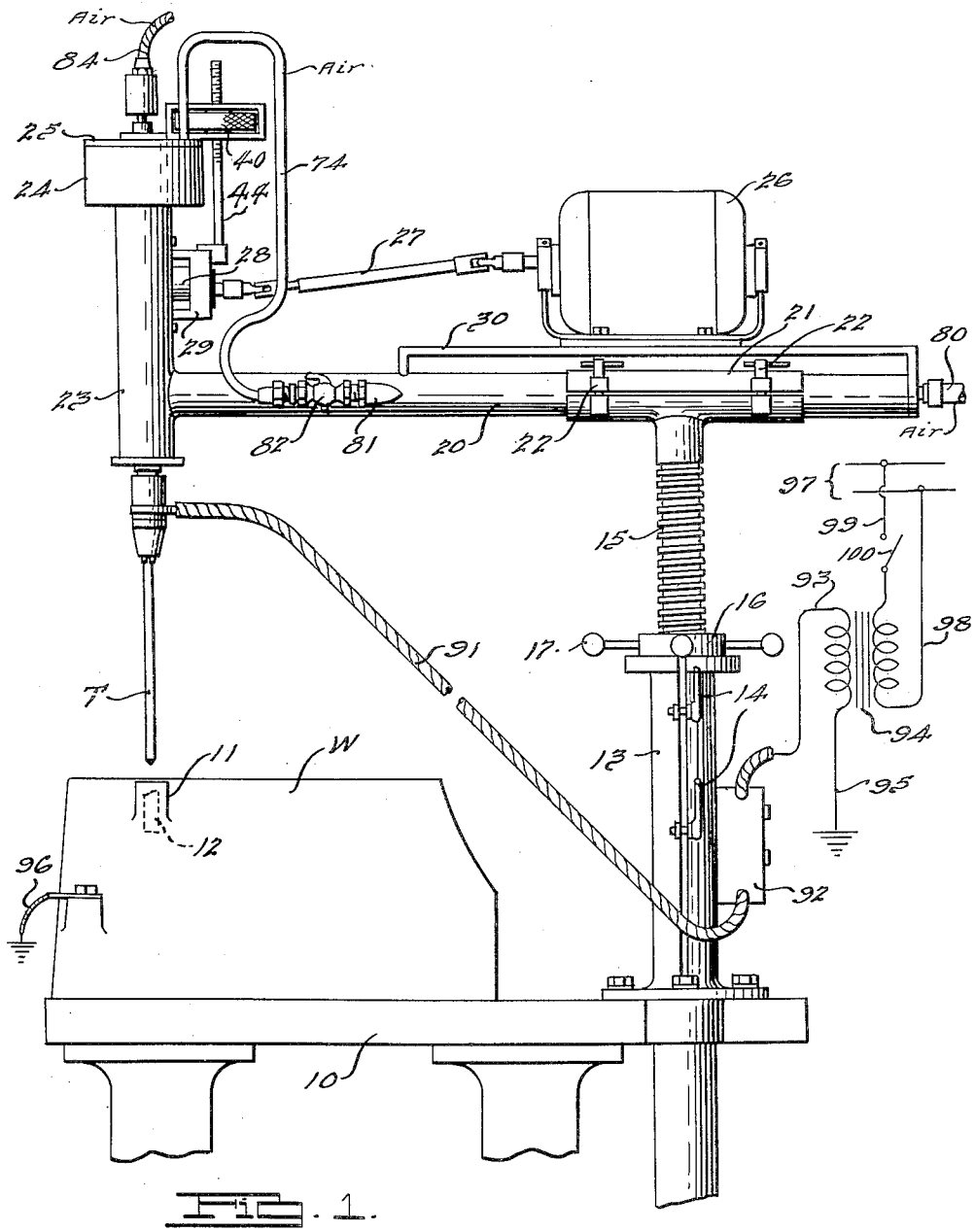

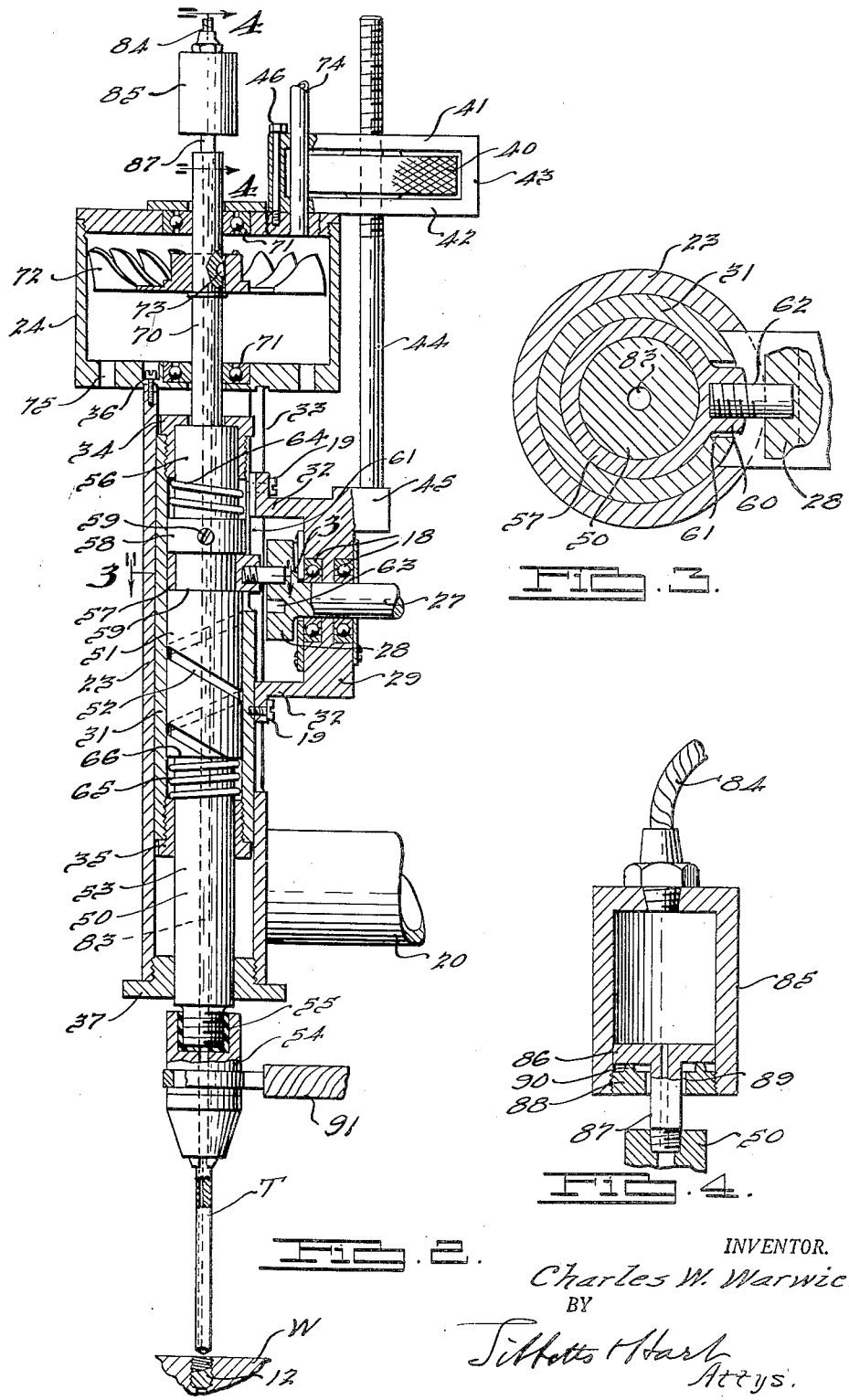

2,385,665

UNITED STATES PATENT OFFICE 2,385,665

ELECTRICAL DEVICE

Charles W. Warwick, Detroit, Mich., assignor to Packard Motor Car Company, Detroit, Mich., a corporation of Michigan Application May 31, 1943, Serial No. 489,227

10 Claims. (Cl. 219—15)

This invention relates to electrical devices and particularly to a device for removing broken taps or drills from the metallic work piece in which they are imbedded, and for other purposes.

In machine operations such as drilling and tapping, the tools, especially small taps and drills, sometimes are broken, leaving a part of the broken tap or drill in the work piece being operated upon. These broken parts can very seldom be removed without greatly enlarging the hole or destroying the threads or otherwise injuring the work piece. The result is that the piece is usually scrapped or if it is used it has either a non-standard hole or thread, making the piece much less valuable. Usually these breaks occur when most of the other machine operations have been performed with the result that scrapping the piece means a considerable loss.

One of the objects of the present invention is to provide a machine that will remove such broken taps or drills by burning them out of the work piece without injury to the work piece itself and without injuring the threads already cut or without increasing the size of the bore. It is an improvement upon the equipment shown and described on page 70 of the magazine "Wings" for July, 1942 (McGraw-Hill Publishing Company, Inc., 330 West 42nd St., New York city).

Other objects of the invention will appear from the following description taken in connection with the drawings which form a part of this specification, and in which Fig. 1 is an elevation of a machine embodying the invention;

Fig. 2 is a section through the working head of the machine;

Fig. 3 is an enlarged section on the line 3—3 of Fig. 2; and

Fig. 4 is an enlarged section of the joint at the top of the work spindle, on the line 4—4 of Fig. 2.

Referring to the drawings, 10 indicates a table or bench upon which a work piece W may be mounted. This work piece in the final stages of its completion has had a threaded tap or drill broken off in the boss 11, the broken part of the tap being indicated at 12 in dotted lines.

Bolted to or otherwise mounted above the table 10 is a standard 13 shown as of split tubular form with clamping devices 14 for clamping it around the threaded shank 15 of an adjustable support. The shank 15 is raised or lowered relative to the standard 13 by means of a threaded sleeve 16 rotated by lever arms 17.

The support is indicated at 20 and it is in the form of a horizontal tube which is adjustably mounted in the head 21 of the shank 15. The support 20 may be adjusted longitudinally in the head 21 and held in position by clamps 22.

At one end the support 20 is formed with a vertical tubular portion or working head 23 at the upper end of which is mounted a casing or housing 24, closed at its upper end by a cover 25.

Mounted on the horizontal portion of the support 20 is an electric motor 26 which drives a universally jointed and extensible shaft 27 for operating an eccentric or cam 28 mounted in a bracket 29, the connections and purpose of which will be hereinafter described. The motor is on a bridge 30 connected at both ends to the support 20 thus allowing for longitudinal adjustment of the support 20 relative to the shank 15.

Referring now more particularly to Figure 2, there is slidably mounted within the vertical tubular portion 23 of the support a sleeve 31 on the side of which is connected the bracket 29 by its two legs 32 and screws 19, which legs extend through a longitudinal slot 33 in the support 23. The upper and lower ends of the sleeve 31 are closed by threaded caps 34 and 35 respectively. This sleeve may be inserted into the part 23 through its upper end prior to the assembly of the casing 24 thereon. The latter is detachably held in place by suitable means such as screws 36. The lower end of the vertical tubular support 23 is closed by a threaded ring 37.

With the sleeve 31 mounted to slide in the head or support portion 23 means are provided by which the operator may slowly move the sleeve in the support for feeding and retracting the tool hereinafter referred to. This hand feeding means is in the form of a knurled wheel 40 mounted between the arms 41 and 42 of a bracket 43 and having threaded connection with a rod 44, the lower end of which is connected to the bracket 29 as at 45. The bracket 43 is shown as mounted on the casing 24 and may be secured thereto as by bolts 46. Thus it will be seen that by turning the wheel 40 the sleeve 31 may be moved up or down, the rod 44 moving the bracket 29 and bracket 29 being connected directly to the sleeve 31.

Mounted within the sleeve 31 is the work spindle or work tool 50 of the device. This spindle extends through both ends of the sleeve 31, through the lower ends of the vertical portion 23 of the support 20 and entirely through the casing 24 mounted at the top of the support. The spindle 50 is of several diameters being largest at about its middle portion 51 where it has a sliding fit in the sleeve 31 and is provided with an oil groove 52. Below this middle portion the spindle is of less diameter as shown at 53 and extends through the cap 35 and the ring 37 where its lower end is connected to tool holder 54 through an insulation cup 55 into which it is threaded. In the tool holder is the work tool tip or working tip T of the spindle, which tip is preferably made of molybdenum or similar material, and it is hollow, being drilled eccentrically for a purpose hereinafter described.

Above the middle portion 51 the spindle 50 is contracted as at 56 and the upper end of this contracted portion has a sliding fit in the cap 34. A ring 57 surrounds this upper contracted portion with a working fit, and a positioning ring 58 held in place by a screw 59 positions the ring 57 between itself and a shoulder 59 on the spindle. This ring 57, shown enlarged in Figure 3, has a boss 60 which extends into a slot 61 in the side of the sleeve 31, and the ring also has a pin 62 mounted in the boss and extending into the eccentric or cam slot 63 of the eccentric or cam 28. The latter is mounted in ball bearings 18 in the bracket 29.

With this construction it will be seen that as the electric motor 26 operates the eccentric 28 through the shaft 27 at say 1,000 R. P. M., the ring 57 will be vibrated or reciprocated in the slot 61 and will carry with it the spindle 50 and the work tip T. For cushioning the reciprocating action of the spindle coil springs are provided. The spring 64 is arranged between the ring 58 and the inner end of the cap 34, and the spring 65 between the shoulder 66 of the spindle and the upper end of the cap 35.

Above the contracted portion 56 of the spindle 50 the spindle is much smaller in diameter where it extends through the casing 24, as shown at 70. This portion of the spindle is mounted in ball bearings 71 in the casing 24.

A means for rotating the work spindle is housed in the casing 24 and is in the form of a rotor or fan 72 keyed to the spindle as at 73. Air under pressure supplied by a pipe 74 feeds air to the rotor against the inclined blades thereof, the air escaping from the openings 75 in the bottom of the casing. Thus the spindle 50 is rotated by the rotor 72 as the latter is operated by the air fed to the upper part of the casing.

Referring to Figure 1, at the right hand end of the support 20 there is an air feed pipe 80 which supplies air under pressure to the interior of the tubular support 20, said support being closed at its left-hand end where it is joined to the vertical portion 23 of the support. At a suitable place at the side of the support 20 is an outlet 81 in which there is a valve 82 connected to the pipe 74 for controlling the supply of air to the rotor 72.

The work spindle is drilled throughout its length as shown in dotted lines at 83, this drilled opening also extending through the tool holder 54 and to the upper end of the passage in the work tip T. Since the spindle 50 is both reciprocated and rotated it is supplied at its upper end with a cooling medium such as air under pressure through a flexible tube 84 and a joint 85. The latter permits turning of the spindle without creating downward pressure and consists of a small cylindrical member to which the flexible tube 84 is connected, and a piston 86 slidably mounted in the cylindrical member and having its shank 87 threaded or otherwise secured into the upper end of the spindle 50. (See Fig. 4.) The lower end of the cylindrical member 85 is closed by a cap 88 through which the shank 87 extends, there being a space 89 between the shank and the opening in the cap. The shank 87 of the piston 86 is drilled so that air will pass from the interior of the cylinder into the drilled portion of the spindle. The cap has a raised annular seat 90 against which the piston is forced when air enters the cylinder, thus sealing the connection but permitting the spindle 50 and piston 86 to turn relative to the cylinder. The flexibility of the supply tube 84 permits lowering and raising movement of the spindle.

Means for supplying a heating current to the working tip T is shown in the form of a flexible conductor 91 leading from a switch 92, conductor 93 to transformer 94, conductor 95 to ground and conductor 96 connecting the work piece W to ground. The other side of the transformer is connected to the current supply lines 97 through conductors 98 and 99 and switch 100. With this arrangement the current at a voltage of say 220 in the supply lines 97 may be reduced, through the transformer, to a voltage of say 10 for the heating circuit.

The cooling medium may be a supply of air under pressure furnished to pipes 80 and 84 by any suitable means, not shown. Also the electric motor 26 may have its required current source, not shown.

In the operation of the device the broken piece of the tap or drill is literally burned out of the work piece. The work piece W is placed on the table 10 in such position that the longitudinal axis of the broken tap 12 is arranged substantially vertically and the conductor 96 connects the work piece with ground. A work tip T of a size slightly smaller, say .025 in., than the root diameter of the broken tap 12 is placed in the holder 54 and the apparatus is then adjusted to bring the work tip vertically in line with the axis of the tap 12. This is accomplished by manipulating the sleeve 16 to bring the support 20 to the correct height and by moving the support 20 horizontally in the head 21 and turning it on the axis of the shank 15 so that the work tip is directly over the tap to be burned out. The clamps 14 and 22 then secure the support in the adjusted position.

The heating current is then turned on by closing the switches 100 and 92 and air or other cooling medium is supplied to the pipes 84 and 74, the latter by turning the valve 82 to produce the desired speed of rotation of the spindle 50. The electric motor is connected with its source of current supply so that the cam 28 is rotated, thus starting the vibration of the spindle 50. With the spindle thus being rotated and reciprocated, the hand wheel 40 is operated to feed the work tip downwardly into contact with the broken tap. The vibration of the tip to the extent of approximately $\frac{1}{16}$ of an inch prevents the heating or welding current passing through the tip to the broken tap from forming a welding connection between the work tip and the tap, and the burning of the tap is started. The air passing through the work tip supplies the necessary oxygen and at the same time blows the burned particles away, keeps the work tip cool and prevents the burning of the work piece surrounding the tool. By the rotation of the work tip the end thereof wears evenly, even though the broken tap has a jagged upper end, as is usually the case, and by reason of the eccentric position of the air outlet of the tip there is no leaving of a core or center portion of the broken tap inside the tool.

As the broken tap in the work piece is burned away the operator feeds the spindle downwardly by turning the wheel 40 until the broken tap has been entirely consumed. The tool is then retracted and the work piece removed from the table.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What is claimed is:

1. In an electrical device, the combination with a hollow work spindle, of means for feeding a heating current thereto, means for feeding a cooling medium through said spindle, means for moving the work spindle toward and from the work to be operated upon, means for longitudinally vibrating the spindle, and means for rotating the spindle throughout its vibrating stroke.

2. In an electrical device, the combination with a hollow work spindle, of means for feeding a heating current thereto, means for feeding air under pressure to said spindle, means for moving the work spindle toward the work, means for longitudinally vibrating the spindle, and means for rotating said spindle as it vibrates.

3. In an electrical device, the combination with a hollow work spindle, of means for feeding a heating current thereto, means for feeding air under pressure to said spindle, means for reciprocating the spindle into and out of contact with the work, and air means for causing rotation of the spindle as it reciprocates.

4. In a device for removing a broken tap or drill from a metallic piece, an eccentrically hollow work tool, a support therefor, means for supplying a heating current to said tool, a reciprocating means, spring means to cushion the blow of the tool against the drill to be operated upon, means for feeding air under pressure through said support to said tool, a rotor connected to rotate said tool, and air means for operating said rotor.

5. In a device for burning out a broken tap or drill from a metallic piece, the combination of a work table, an adjustable support mounted above the work table, a work spindle on said support, a work tip on said work spindle, means for supplying a heating current to said work tip, means for feeding air under pressure through said work tip, means for feeding said spindle and work tip toward and from the broken tap or drill, means in addition to the feeding means for reciprocating said work tip, and means for rotating the work tip.

6. In an electrical device, the combination of a tubular support, a sleeve mounted to slide therein, a work spindle mounted to slide within the sleeve, a work tip secured to and insulated from said spindle, means for supplying a heating current to said work tip, means for feeding the sleeve and spindle relative to the support, means for vibrating the spindle relative to the sleeve, and means for rotating the spindle independently of the sleeve.

7. In an electrical device, the combination of a tubular support, a sleeve mounted to slide therein, a work spindle mounted to slide within the sleeve, a work tip secured to and insulated from said spindle, means for supplying a heating current to said work tip, means for feeding the sleeve and spindle relative to the support, and means for vibrating the spindle relative to the sleeve.

8. In an electrical device, the combination with a table to support the work to be operated on, of a work spindle having a hollow tip, means for progressively feeding the work spindle, means independent of the spindle feeding means for vibrating the work spindle, means for rotating the hollow tip, and means for supplying a heating current including a conductor electrically connected to said tip.

9. An electrical device for burning metal, the combination with a spindle having a hollow working tip with an outlet at its end, of means for supplying a heating current to said tip, means for feeding a cooling medium through the tip to said outlet, and means for rotating said tip about an axis eccentric to the center of said outlet.

10. In an electrical device, the combination with a work tool having a longitudinal opening therethrough, of means for supplying a heating current to said tool, means for feeding a cooling medium to and through said tool, and means for rotating the tool about a longitudinal axis eccentric to said opening.

CHARLES W. WARWICK.